United States Patent
Iwai et al.

(10) Patent No.: US 9,036,584 B2
(45) Date of Patent: May 19, 2015

(54) BASE STATION, MOBILE STATION, METHOD FOR TRANSMITTING CALCULATION PARAMETERS FOR POWER HEADROOM, AND METHOD FOR TRANSMITTING POWER HEADROOM

(75) Inventors: Takashi Iwai, Ishikawa (JP); Shinsuke Takaoka, Osaka (JP); Akihiko Nishio, Kanagawa (JP); Masayuki Hoshino, Kanagawa (JP); Daichi Imamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 209 days.

(21) Appl. No.: 13/812,001
(22) PCT Filed: Jul. 11, 2011
(86) PCT No.: PCT/JP2011/003959
§ 371 (c)(1),
(2), (4) Date: Jan. 24, 2013
(87) PCT Pub. No.: WO2012/020539
PCT Pub. Date: Feb. 16, 2012

(65) Prior Publication Data
US 2013/0128856 A1    May 23, 2013

(30) Foreign Application Priority Data
Aug. 9, 2010  (JP) ................................ 2010-178672

(51) Int. Cl.
*H04W 4/00* (2009.01)
*H04W 72/04* (2009.01)
(Continued)

(52) U.S. Cl.
CPC ........... *H04W 72/0413* (2013.01); *H04L 5/001* (2013.01); *H04L 5/0053* (2013.01);
(Continued)

(58) Field of Classification Search
CPC ............ H04W 52/365; H04W 52/146; H04W 72/0413; H04W 72/042; H04W 24/08; H04W 88/02; H04W 72/1284; H04L 5/0007; H04L 47/14; H04L 1/0003; H04L 1/1812
See application file for complete search history.

(56) References Cited

U.S. PATENT DOCUMENTS

2006/0172781 A1*  8/2006  Mohebbi ....................... 455/571
2007/0027015 A1   2/2007  Zhou et al.
(Continued)

FOREIGN PATENT DOCUMENTS

JP    2009-531996 A   9/2009
WO   2010087138 A1   8/2010

OTHER PUBLICATIONS

Final Report of 3GPP TSG RAN WG1 #61, Dresden, Germany, Jun. 28-Jul. 2, 2010, R1-104183.
International Search Report for PCT/JP2011/003959 dated Oct. 11, 2011.

*Primary Examiner* — Chi H Pham
*Assistant Examiner* — Raul Rivas
(74) *Attorney, Agent, or Firm* — Pearne & Gordon LLP

(57) ABSTRACT

Provided are a base station, a mobile station, a method for transmitting calculation parameters for a power headroom and a method for transmitting a power headroom capable of increasing the accuracy of link adaptation by reducing the probability that a power headroom value is out of a reported range. In a base station (100), a PHR bandwidth notifier (105) determines a bandwidth for power headroom calculation to be used for calculating a power headroom by a mobile station (200) for a component carrier to which an unlink allocation signal (UL grant) is not mapped and generates a notification signal containing information on the determined bandwidth for power headroom calculation, and a transmitting means (modulator (106), transmission RF unit (107)) transmits the generated notification signal to the mobile station (200). Specifically, the PHR bandwidth notifier (105) determines a bandwidth for PHR calculation according to an estimated path-loss level.

5 Claims, 17 Drawing Sheets

(51) Int. Cl.
*H04L 5/00* (2006.01)
*H04W 52/36* (2009.01)
*H04W 52/34* (2009.01)
*H04W 52/24* (2009.01)

(52) U.S. Cl.
CPC ............ *H04L5/0064* (2013.01); *H04L 5/0094* (2013.01); *H04W 52/365* (2013.01); *H04W 52/34* (2013.01); *H04W 52/242* (2013.01)

(56) References Cited

U.S. PATENT DOCUMENTS

| | | | |
|---|---|---|---|
| 2010/0189058 A1* | 7/2010 | Kawamura et al. | 370/329 |
| 2011/0113433 A1* | 5/2011 | Koyanagi et al. | 718/104 |
| 2011/0281614 A1 | 11/2011 | Kitahara | |
| 2012/0026936 A1* | 2/2012 | Zhang et al. | 370/315 |

* cited by examiner

| SYSTEM BANDWIDTH | BANDWIDTH FOR PHR CALCULATION (Mpusch) [RB] | | PATH LOSS (PL) |
|---|---|---|---|
| 20MHz (100RBs) | #1 | 25 | X1 ≦ PL |
| | #2 | 50 | X2 ≦ PL < X1 |
| | #3 | 75 | X3 ≦ PL < X2 |
| | #4 | 100 | PL < X3 |

FIG.7

| SYSTEM BANDWIDTH | BANDWIDTH FOR PHR CALCULATION (Mpusch) [RB] | | PATH LOSS (PL) |
|---|---|---|---|
| 10MHz (50RBs) | #1 | 17 | $Y1 \leq PL$ |
| | #2 | 34 | $Y2 \leq PL < Y1$ |
| | #3 | 50 | $PL < Y2$ |

FIG.8

| SRS BW configuration | SRS BW1 [RB] | SRS BW2 [RB] | SRS BW3 [RB] | SRS BW4 [RB] |
|---|---|---|---|---|
| 0 | 96 | 48 | 24 | 4 |
| 1 | 96 | 32 | 16 | 4 |
| . | . | . | . | . |
| . | . | . | . | . |
| . | . | . | . | . |
| 7 | 48 | 16 | 8 | 4 |

FIG.12

| BANDWIDTH FOR PHR CALCULATION (Mpusch) [RB] | | PATH LOSS (PL) |
|---|---|---|
| #1 | 4 | $Z1 \leq PL$ |
| #2 | 24 | $Z2 \leq PL < Z1$ |
| #3 | 48 | $Z3 \leq PL < Z2$ |
| #4 | 96 | $PL < Z3$ |

FIG.13

| BANDWIDTH FOR PHR CALCULATION (Mpusch) [RB] | | PATH LOSS (PL) |
|---|---|---|
| #1 | 4 | 115 ≦ PL |
| #2 | 24 | 110 ≦ PL < 115 |
| #3 | 48 | 105 ≦ PL < 110 |
| #4 | 96 | PL < 105 |

FIG.16

BASE STATION, MOBILE STATION, METHOD FOR TRANSMITTING CALCULATION PARAMETERS FOR POWER HEADROOM, AND METHOD FOR TRANSMITTING POWER HEADROOM

TECHNICAL FIELD

The present invention relates to a base station, a mobile station, a method for transmitting power headroom calculation parameters and a method for transmitting a power headroom.

BACKGROUND ART

For uplinks of LTE-Advanced (hereinafter referred to as "LTE-A") which is an evolved version of 3GPP LTE (3rd Generation Partnership Project Long-term Evolution, hereinafter referred to as "LTE"), introduction of a band extension technique called "Carrier Aggregation (CA)" is under study. CA in LTE-A seeks to realize high speed transmission using a plurality of bundled component carriers (CCs). One component carrier has a bandwidth of maximum 20 MHz.

In LTE-A, it is agreed that a terminal should report PHR (Power Headroom=information on a reserve capacity of transmission power of the terminal) to a base station for each CC. PHR is used by a base station to perform link adaptation (adaptive modulation, channel coding, closed loop transmission power control or the like) of a transmission channel of a terminal. Following equation 1 is a definition equation of PHR used in LTE.

[1]

$$PHR = Pcmax - \{10 \log_{10}(Mpusch) + Po\_pusch + \alpha \cdot PL + \Delta tf + f(i)\} \quad \text{(Equation 1)}$$

Here, Pcmax is maximum transmission power [dBm] of the terminal, Mpusch is transmission bandwidth [RB] of PUSCH, Po_pusch is a value [dBm] preset by the base station, PL is a path-loss level [dB] measured by the mobile station, $\alpha$ is a weighting factor representing a compensation proportion of path loss and is a preset value, $\Delta tf$ is an MCS-dependent offset of data transmitted, f(i) is a transmission power control value (e.g., relative value such as +3 dB or −1 dB) in subframe #i and is an accumulation past transmission power control values.

Po_pusch, $\alpha$ and $\Delta tf$ are parameters instructed from the base station to the mobile station and are values that can be comprehended by the base station. However, PL and f(i) cannot be exactly comprehended by the base station. That is, f(i) is a parameter instructed from the base station to the mobile station but the mobile station may not be able to receive the instruction (that is, the mobile station may not be able to detect a control channel (PDCCH)). Since the base station cannot decide whether the mobile station has successfully received the instruction or not, if the mobile station fails even once to receive the transmission power control value of the base station, there will be a mismatch in recognition between the mobile station and the base station. Thus, since the base station cannot exactly comprehend PHR of the mobile station, the base station needs to have PHR reported from the mobile station.

Furthermore, PHR of LTE is reported from the terminal to the base station under predetermined conditions determined beforehand by the base station (e.g., in a predetermined cycle or when PL varies more than a threshold). To be more specific, PHR of LTE is reported on PUSCH as MAC (Medium Access Control) information, of transmission data PHR of LTE is reported as information of 6 bits.

Parameters (Po_pusch, $\alpha$) of equation 1 and scheduling information (Mpusch, $\Delta tf$, f(i)) are set independently among CCs. Thus, PHR for each CC is calculated using parameters and scheduling information of each CC according to equation 1.

Furthermore, as a method of reporting PHR when a plurality of UL CCs are set for a terminal, it is agreed that the terminal feeds back PHRs of all set (configured) CCs to the base station using a UL channel when triggered for PHR reporting. However, even when a plurality of UL CCs are configured for the terminal, UL CCs actually, used at certain timing may be some of the plurality of configured UL CCs. In this case, the base station does not report any UL grant (transmission format information; UL transmission bandwidth, MCS information or the like) to the terminal through unused UL CCs. Therefore, for UL CCs with no UL grant allocated, the terminal cannot calculate transmission power and PHR of PUSCH (see FIG. 1). In FIG. 1, rectangles denote regions (that is, PUSCH regions) to transmit PUSCH signals. Rectangles enclosed by dotted lines in particular denote PUSCH regions with no UL grant allocated (not transmitted) and rectangles enclosed by solid lines denote PUSCH regions with UL grants allocated (transmitted).

Here, at PHR report timing, Mpusch and $\Delta tf$ in equation 1 are not configured for the terminal in CCs with no UL grant allocated in the PUSCH region. For this reason, the terminal cannot calculate PHR using equation 1 in a conventional manner. Thus, it is necessary to define a calculation equation (called "Reference Format" or "Virtual Format") to calculate PHRs of CCs with no UL grant allocated.

For PUCCH, the following items are agreed. That is, when no PUCCH is transmitted, it is agreed that all terminals use bandwidth=1 RB, $\Delta f$ (offset dependent on PUCCH format)=0 dB in the reference format of PUCCH used to calculate PHR of PUCCH (that is, reserve capacity of transmission power of the terminal in PUCCH transmission) (Non-Patent Literature 1).

CITATION LIST

Non-Patent Literature

NPL 1
R1-104183, "Final Report of 3GPP TSG RAN WG1 #61"

SUMMARY OF INVENTION

Technical Problem

Therefore, as for the method of reporting PHR when a plurality of UL CCs are set for the terminal as in the case of PUCCH, a method may be adopted whereby a fixed bandwidth (Mpusch) and $\Delta tf$ are defined beforehand for all terminals as a reference format of PUSCH with no UL grant allocated.

In this case, as shown in equation 2, a method may be adopted whereby all terminals use bandwidth (Mpusch)=1 RB, $\Delta tf$=0 dB for as a reference format of PUSCH as well. In this way, the base station can comprehend PL and f(i) of the terminal.

[2]

$$PHR = Pcmax - \{Po\_pusch + \alpha \cdot PL + f(i)\} \quad \text{(Equation 2)}$$

However, when Mpusch is assumed to be fixed, there is a problem that calculated PHRs often fall out of a reported range. The reported range of PHR is −23 dB to +40 dB.

To be more specific, when an actual PHR exceeds an upper limit value (40 dB), the PHR reported from the terminal to the base station is clipped to the upper limit value (40 dB). On the contrary, when the actual PHR falls below a lower limit value (−23 dB), the PHR reported is clipped to the lower limit value (−23 dB).

In LTE, bandwidths are scheduled by base stations in consideration of path-loss levels of terminals and PHRs are always calculated using scheduled bandwidths, and therefore PHRs do not often fall out of the reported range. However, when Mpusch is assumed to be fixed (that is, when PHR is calculated using equation 2), the calculated value of PHR often falls out of the reported range depending on the path-loss level of the terminal.

FIG. 2 shows a CDF distribution of path loss value (PL) of a terminal in a cellular environment with ISD (distance between base stations)=500 m obtained by simulation. Furthermore, FIG. 3 shows a correlation between a path loss value (PL) of the terminal and PHR calculated using equation 2 above. Here, as parameters in equation 2, Po_pusch=−90 dBm, $\alpha$=0.8, f(i)=0 dB are set.

It is clear from FIG. 3 that when the path loss is smaller than 92 dB, the PHR falls out of the reported range (that is, exceeds 40 dB). Furthermore, it is clear from FIG. 2 that approximately 3% of terminals have path loss smaller than 92 dB (that is, terminals whose PHR falls out of the reported range) under this condition. In a cellular environment where ISD is smaller than 500 m, the proportion of terminals having small PL increases, and therefore the number of terminals whose PHR falls out of the reported range is estimated to further increase.

Thus, when the PHR falls out of the reported range, an error occurs in the reserve capacity of transmission power of the terminal recognized by the base station. This error has an influence on link adaptation of the base station. To be more specific, when PHR exceeds an upper limit value, the base station recognizes the reserve capacity of the terminal to be a value smaller than the actual one. Therefore, MCS or transmission bandwidth is limited to a smaller value. On the other hand, when the PHR fails below an upper limit value, the base station recognizes the reserve capacity of the terminal to be a value greater than the actual one. Therefore, MCS or transmission bandwidth is excessively assigned (that is, the setting exceeds maximum transmission power). The number of errors in link adaptation increases in this way, which results in a problem that the system performance deteriorates as a consequence.

It is an object of the present invention to provide a base station, a mobile station, a method for transmitting power headroom calculation parameters and a method for transmitting a power headroom capable of improving the accuracy of link adaptation by reducing a probability that a power headroom value may fall out of the reported range.

Solution to Problem

A base station according to an aspect of the present invention is a base station that configures a plurality of component carriers for a mobile station and communicates with the mobile station using at least one of the plurality of component carriers, including a signal generation section that determines a bandwidth for power headroom calculation used by the mobile station to calculate a power headroom representing transmission power reserve capacity of the mobile station in component carriers with no uplink allocation control signal allocated, and generates a notification signal containing information on the determined bandwidth for power headroom calculation, and a transmitting section that transmits the generated notification signal to the mobile station.

A mobile station according to an aspect of the present invention is a mobile station that communicates with a base station using at least one of a plurality of component carriers configured by the base station, including a calculation section that calculates a power headroom of a component carrier with no uplink allocation control signal allocated based on information on a bandwidth for power headroom calculation transmitted from the base station used to calculate a power headroom representing a transmission power reserve capacity in the component carrier with no uplink allocation control signal allocated or a bandwidth used by the mobile station for last transmission of a sounding reference signal, and a transmitting section that transmits the calculated power headroom to the base station.

A method for transmitting calculation parameters for a power headroom according to an aspect of the present invention determines a bandwidth for power headroom calculation used a mobile station to calculate a power headroom representing a transmission power reserve capacity of the mobile station component carrier with no uplink allocation control signal allocated, generates a notification signal containing information on the determined bandwidth for power headroom calculation and transmits the generated notification signal to the mobile station.

A method for transmitting a power headroom according to an aspect of the present invention calculates a power headroom of a component carrier with no uplink allocation control signal allocated based on information a bandwidth for power headroom calculation transmitted from a base station used to calculate a power headroom representing a transmission power reserve capacity in the component carrier with no uplink allocation control signal allocated or a bandwidth used by the mobile station for last transmission of a sounding reference signal, and transmits the calculated power headroom to the base station.

Advantageous Effects of Invention

According to the present invention, it is possible to provide a base station, a mobile station, a method for transmitting calculation parameters for a power headroom and a method for transmitting a power headroom capable of improving the accuracy of link adaptation by reducing a probability that a power headroom value may fall out of a reported range.

BRIEF DESCRIPTION OF DRAWINGS

FIG. 7 is a diagram illustrating Bandwidth Part defined in a CQI report of LTE;

FIG. 8 is a diagram illustrating Bandwidth Part defined in a CQI report of LTE;

FIG. 12 is a diagram illustrating a setting of an SRS bandwidth in LTE;

FIG. 13 is a diagram illustrating a bandwidth determining table;

FIG. 16 is a diagram illustrating a correlation between an estimated path-loss level candidate and a bandwidth for PHR calculation corresponding to each estimated path-loss level candidate;

DESCRIPTION OF EMBODIMENTS

Figure 1:
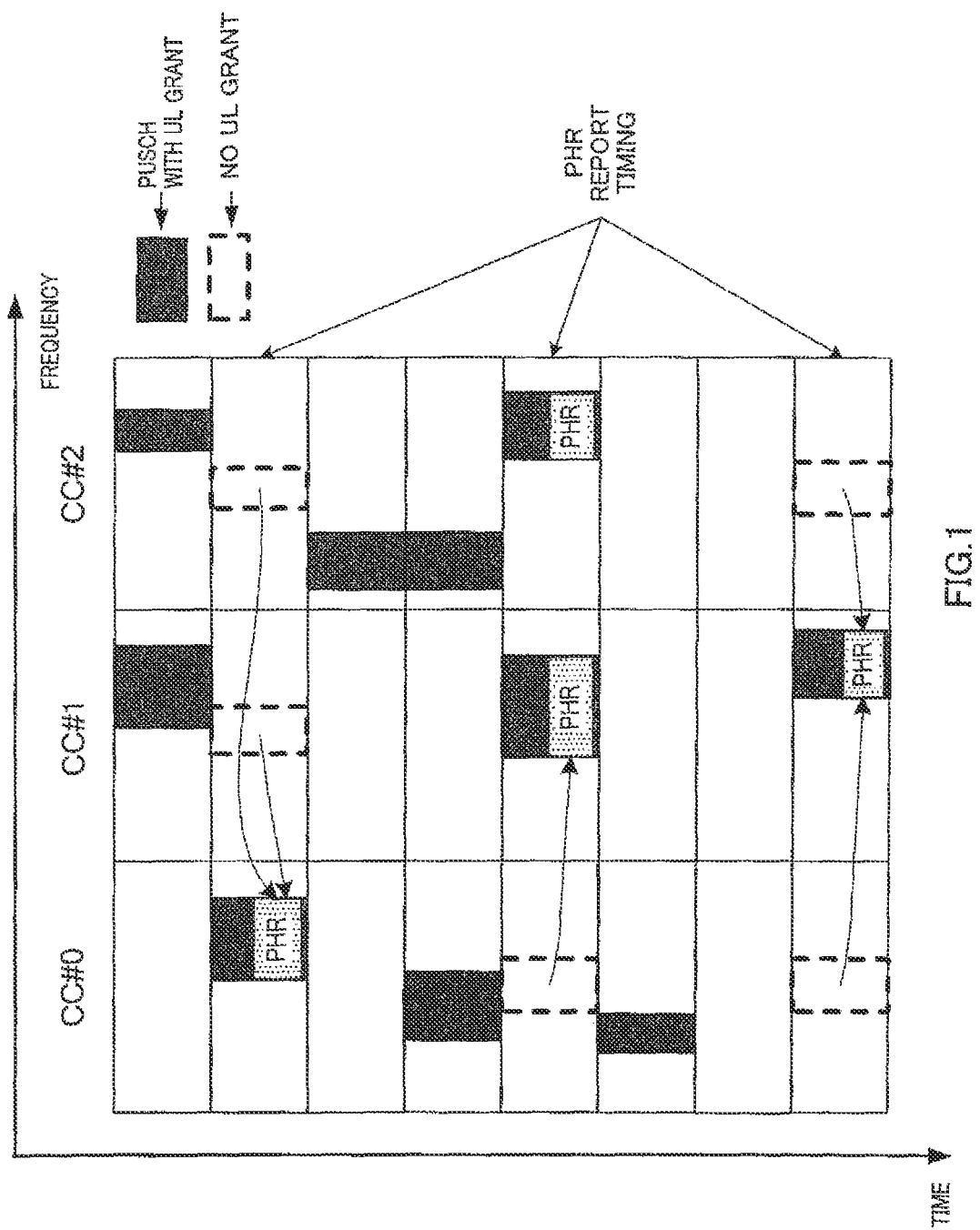
FIG. 1 is a diagram illustrating a PHR calculation in UL CCs with no UL grant.
Figure 2:
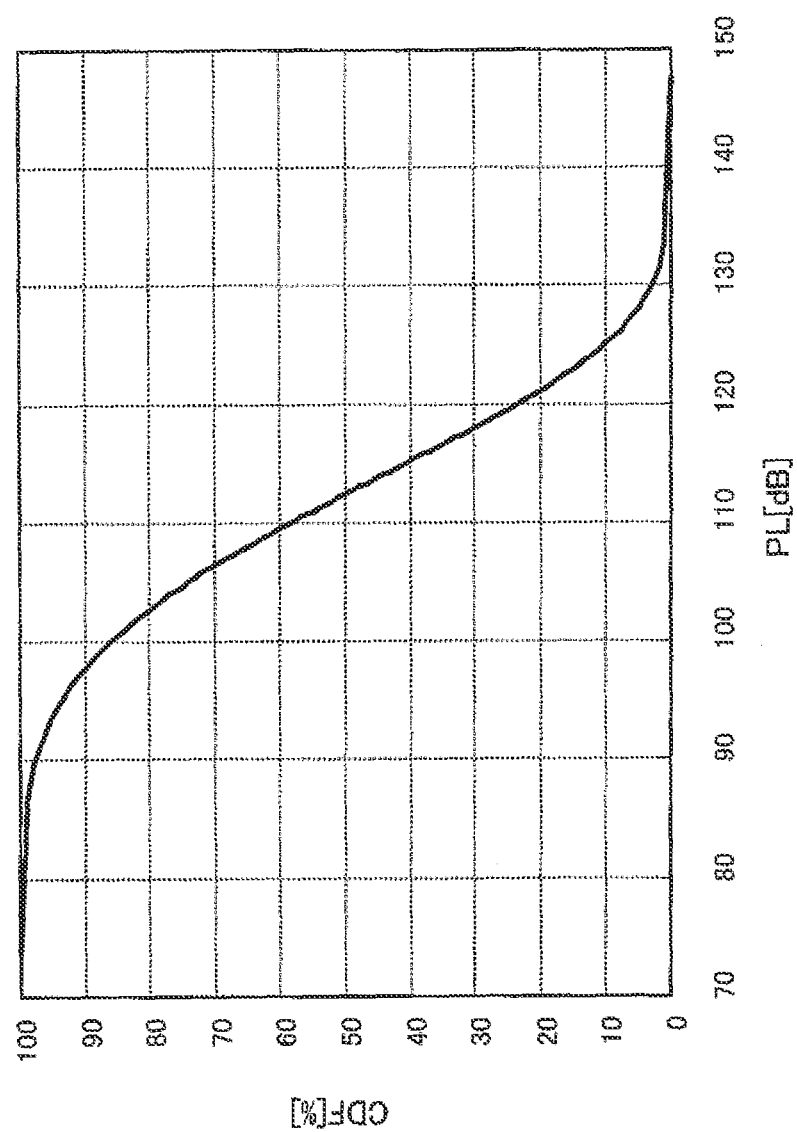
FIG. 2 is a diagram illustrating a CDF distribution of path loss value of a terminal obtained by simulation.
Figure 3:
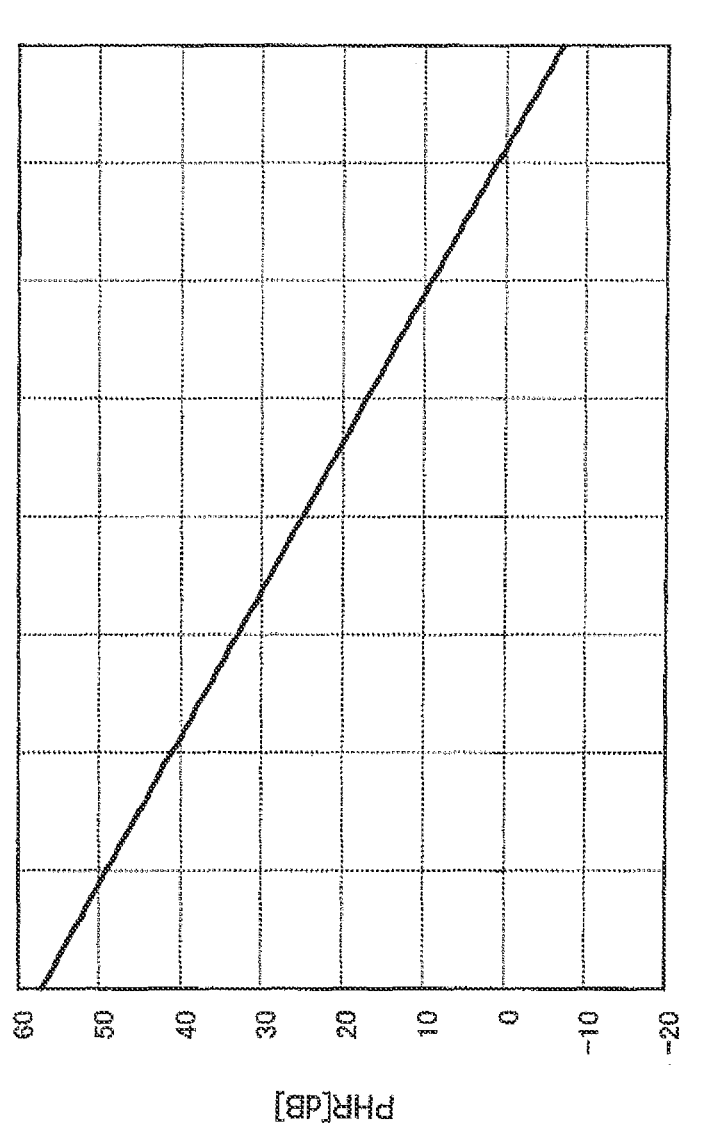
FIG. 3 is a diagram illustrating a correlation between a path loss value and PHR of the terminal.

Hereinafter, embodiments of the present invention will be described in detail reference to the accompanying drawings. Identical components among the embodiments will be assigned identical reference numerals and overlapping descriptions thereof will be omitted.

[Embodiment 1]

[Overview of Communication System]

A communication system according to Embodiment 1 of the present invention eludes base station 100 and mobile station 200. Base station 100 configures a plurality of component carriers for mobile station 200 and communicates with mobile station 200 using at least one of the plurality of configured component carriers.

Figure 4:
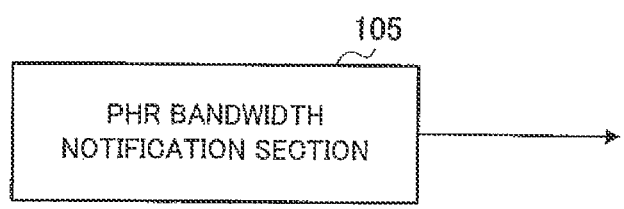
FIG. 4 is a main configuration diagram of a base station according to Embodiment 1 of the present invention.

FIG. 4 is a main configuration diagram of base station 100 according to Embodiment 1 of the present invention. In base station 100, PHR bandwidth notification section 105 determines a bandwidth for power headroom calculation used by mobile station 200 to calculate a power headroom in a component carrier to which no uplink allocation signal (UL grant) is mapped and forms a notification signal containing information on the determined bandwidth for power headroom calculation. The notification signal formed in this way is transmitted to mobile station 200.

Figure 5:
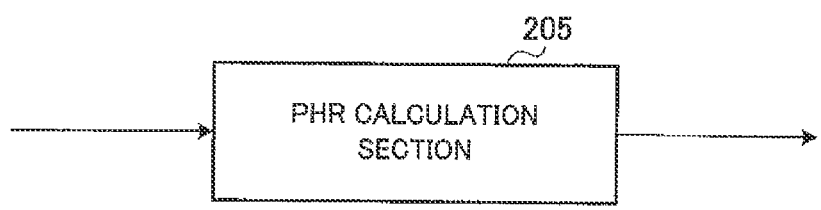
FIG. 5 is a main configuration diagram of a mobile station according to Embodiment 1 of the present invention.

FIG. 5 is a main configuration diagram of mobile station 200 according to Embodiment 1 of the present invention. In mobile station 200, PHR calculation section 205 calculates a power headroom of a component carrier with no uplink allocation signal mapped thereto based on information on a bandwidth for power headroom calculation transmitted from base station 100 used to calculate a power headroom representing a transmission power reserve capacity in the component carrier with no uplink allocation signal mapped thereto. The power headroom of the component carrier with no uplink allocation signal mapped thereto calculated in this way is transmitted to base station 100.

[Configuration of Base Station 100]

Figure 6:
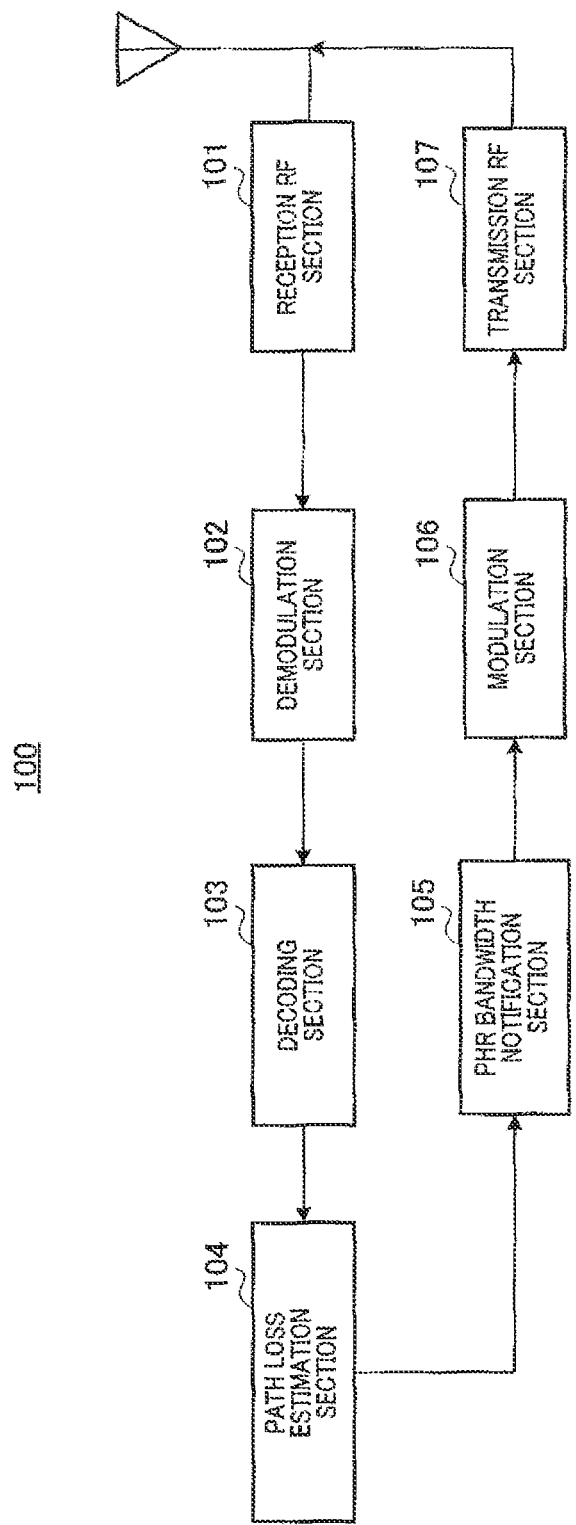
FIG. 6 is a block diagram illustrating a configuration of the base station according to Embodiment 1 of the present invention.

FIG. 6 is a block diagram illustrating a configuration of base station 100 according to Embodiment 1 of the present invention. In FIG. 6, base station 100 includes reception RF section 101, demodulation section 102, decoding section 103, path loss estimation section 104, PHR bandwidth notification section 105, modulation section 106 and transmission RF section 107.

Reception RF section 101 applies reception processing (down-conversion, A/D conversion or the like) to a signal received via an antenna and outputs the received signal subjected to the reception processing to demodulation section 102.

Demodulation section 102 extracts a signal transmitted from desired mobile station 200 from the received signal and applies equalization processing to the extracted signal using a signal representing a frequency response of a propagation path. The signal subjected to this equalization processing is outputted to decoding section 103.

Decoding section 103 applies decoding processing to the signal received from demodulation section 102 and outputs information on a path-loss level of mobile station 200 contained in the received data obtained (hereinafter may be simply referred to as "path-loss level information") to path loss estimation section 104. The information on the path-loss level of mobile station 200 is PHR of mobile station 200, report value of the received signal level of mobile station 200 or the like.

Path loss estimation section 104 estimates the path-loss level of mobile station 200 based on the path-loss level is information received from decoding section 103 and outputs the estimated path-loss level to PHR bandwidth notification section 105.

PER bandwidth notification section 105 determines a bandwidth for PHR calculation corresponding to the estimated path-loss level and forms a notification signal including the information on the bandwidth for PER calculation. This notification signal is outputted to modulation section 106. Here, the bandwidth for PHR calculation is a parameter (offset value) used by mobile station 200 to calculate PHR for CC with no UL grant allocated at PER report timing of mobile station 200. The bandwidth for PHR calculation is transmitted to mobile determining processing and transmission processing may be executed only when information on the bandwidth for PHR calculation (hereinafter may be simply referred to as "PHR calculation bandwidth information") is not reported to mobile station 200 which is the source of transmission of the path-loss level information received by base station 100 or when the reported bandwidth for PHR calculation is different from the bandwidth for PHR calculation determined this time.

To be more specific, PHR bandwidth notification section 105 stores a bandwidth determining table in which N types (N is a natural number) of estimated path-loss level candidates are associated with bandwidths for PHR calculation (Mpusch) corresponding to the respective estimated path-loss level candidates in a memory provided for PHR bandwidth is notification section 105. That is, bandwidths for PHR calculation corresponding to estimated path-loss level candidates are defined beforehand. Furthermore, the bandwidth determining table includes at least one bandwidth for PHR calculation smaller than ½ of the system bandwidth and at least one bandwidth for PHR calculation greater than the ½ width of the system bandwidth.

Furthermore, one estimated path-loss level candidate may be one value or a range of path-loss level. Furthermore, Bandwidth Part defined in an LTE CQI (frequency-selective CQI)

report as shown, for example, in FIG. 7 and FIG. 8 may be reused for the bandwidth for PHR calculation. Alternatively, a bandwidth corresponding to hopping that takes place between VDRB slots defined on an LTE downlink may also be used for the bandwidth for PHR calculation. Reusing bandwidths of different sizes defined beforehand in the system eliminates the necessity for new signaling or table definition.

Furthermore, a bandwidth for PHR calculation corresponding to an estimated path-loss level candidate greater than a predetermined threshold and an estimated path-loss level candidate corresponding to an estimated path-loss level candidate smaller than the threshold may also be defined. To be more specific, as shown in the following example, the bandwidth for PHR calculation is defined beforehand so that a smaller bandwidth (Mpusch) is used to calculate PHR for mobile station 200 having a large path loss. For example, for mobile station 200 having a small path loss, a bandwidth for PHR calculation greater than ½ of the system bandwidth is set, and on the contrary, for mobile station 200 having a large path loss, bandwidth for PHR calculation equal to or smaller than ½ of the system bandwidth is set.

PHR bandwidth notification section 105 then selects bandwidth for PHR calculation associated with an estimated path-loss level received from path loss estimation section 104 in the bandwidth determining table and outputs information on the selected bandwidth for PHR calculation to modulation section 106. Here, the PHR calculation bandwidth information may be the value of the bandwidth for PHR calculation itself or identification information (e.g., index) of the bandwidth for PHR calculation. Here, description will be given assuming that identification information of the bandwidth for PHR calculation is used as the PHR calculation bandwidth information.

Modulation section 106 applies modulation processing to the information on the bandwidth for PHR calculation received from PHR bandwidth notification section 105 and outputs the modulated signal to transmission RE section 107.

Transmission RP section 107 applies transmission processing (D/A conversion, up-conversion, amplification or the like) to the modulated signal and transmits the modulated signal via the antenna.

[Configuration of Mobile Station 200]

Figure 9:
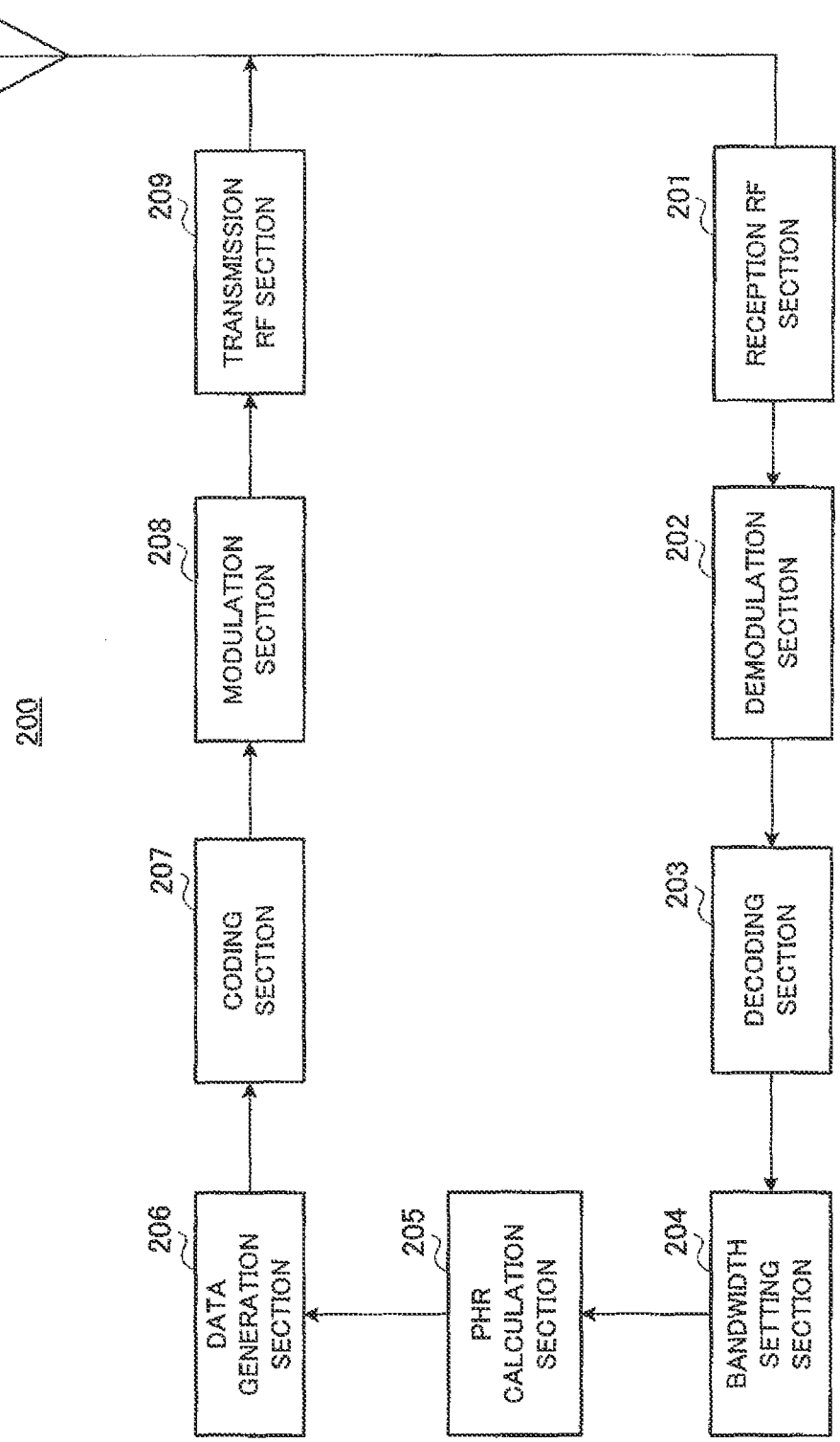
FIG. 9 is a block diagram illustrating a configuration of the mobile station according to Embodiment 1 of the present invention.

FIG. 9 is a block diagram illustrating a configuration of mobile station 200 according to Embodiment 1 of the present invention. In FIG. 9, mobile station 200 includes reception RE section 201, demodulation section 202, decoding section 203, bandwidth setting section 204, PHR calculation section 205, data generation section 206, coding section 207, modulation section 208 and transmission RF section 209.

Reception RF section 201 applies reception processing (down-conversion, A/D conversion or the like) to a signal received via an antenna and outputs the received signal subjected to the reception processing to demodulation section 202.

Demodulation section 202 extracts a signal transmitted from base station 100 from the received signal and applies equalization processing to the extracted signal using a signal indicating a frequency response of a propagation path. The signal subjected to the equalization processing is outputted to decoding section 203.

Decoding section 203 applies decoding processing to the signal received from demodulation section 202 and outputs PHR calculation bandwidth information contained in the received data obtained to bandwidth setting section 204. Here, PHR calculation bandwidth information is information indicating a parameter (offset value) used by mobile station 200 to calculate PHR for CC with no UL grant allocated at PHR report timing of mobile station 200.

Bandwidth setting section 204 identifies a bandwidth corresponding to the PHR calculation bandwidth information received from decoding section 203 and sets the identified bandwidth in PHR calculation section 205.

To be more specific, bandwidth setting section 204 stores a bandwidth determining table identical to that of PHR bandwidth notification section 105. Bandwidth setting section 204 selects a bandwidth for PHR calculation associated with the PHR calculation bandwidth information received from bandwidth setting section 204 in the bandwidth determining table and outputs the selected bandwidth for PHR calculation to PHR calculation section 205.

PHR calculation section 205 calculates PHR for CC with no UL grant allocated based on the bandwidth for PHR calculation received from bandwidth setting section 204.

To be more specific, PHR calculation section 205 calculates PHR for CC with no UL grant allocated using equation 3 below. Here, equation 3 is a definition equation assuming that Δtf is 0 dB in equation 1.

[3]

$$PHR = Pcmax - \{10 \log_{10}(Mpusch) + Po\_pusch + \alpha \cdot PL + f(i)\} \quad \text{(Equation 3)}$$

The PHR calculated in this way is outputted to data generation section 206.

Data generation section 206 generates a data sequence including the PHR received from PHR calculation section 205 and outputs the data sequence to coding section 207 as transmission data.

Coding section 207 encodes transmission data and outputs the coded data to modulation section 208.

Modulation section 208 modulates the coded data received from coding section 207 and outputs the modulated signal to transmission RF section 209.

Transmission RF section 209 applies transmission processing (D/A conversion, up-conversion, amplification or the like) to the modulated signal and transmits the modulated signal via the antenna.

[Operations of Base Station 100 and Mobile Station 200]

Figure 10:
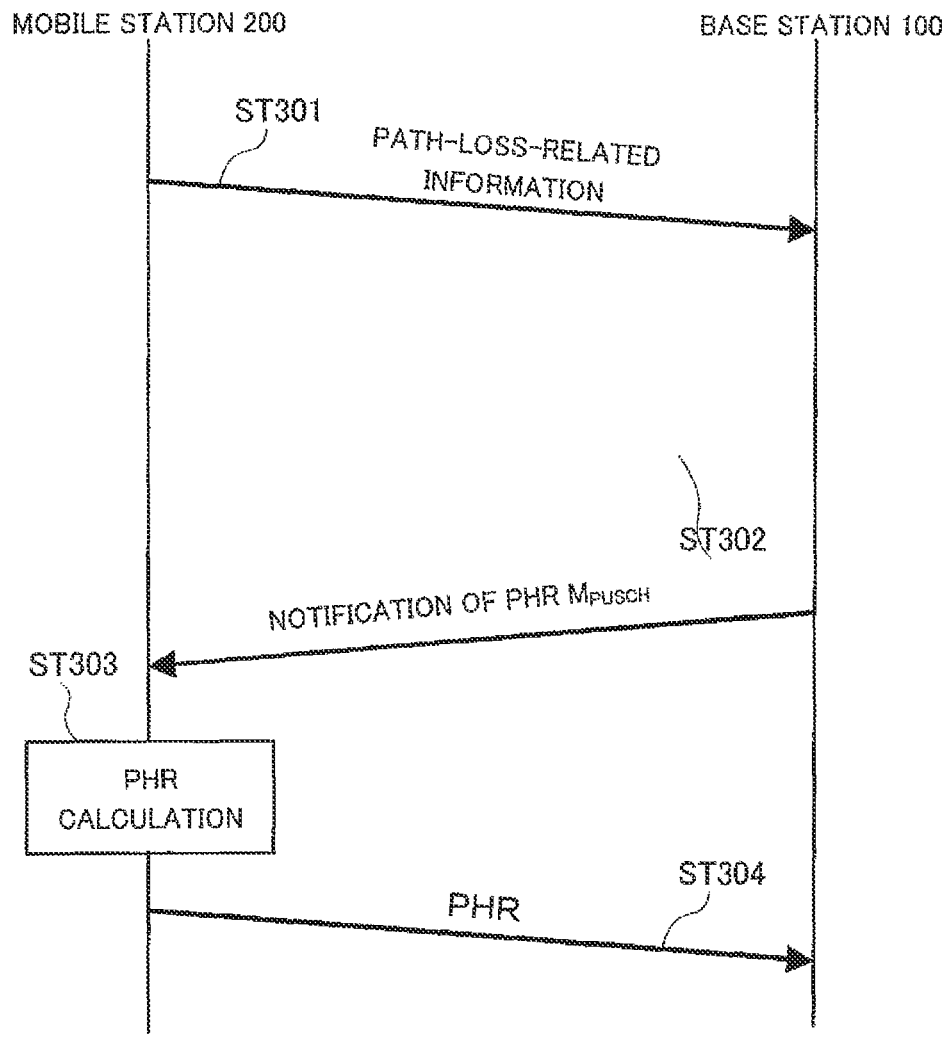
FIG. 10 is a sequence diagram illustrating operations of the base station and the mobile station.

Operations of base station 100 and mobile station 200 having the above configurations will be described. FIG. 10 is a flowchart illustrating operations of base station 100 and mobile station 200.

In step ST301, mobile station 200 reports path-loss level information of mobile station 200 to base station 100.

Base station 100 estimates a path-loss level of mobile station 200 and determines a bandwidth for PHR calculation corresponding to the estimated path-loss level.

In step ST302, base station 100 reports the determined PHR calculation bandwidth information ($M_{pusch}$ for PHR. FIG. 10) to mobile station 200. This reporting need not be performed every time a PHR is reported but may be performed only when the path-loss level of mobile station 200 varies and $M_{pusch}$ needs to be updated.

In step ST303, mobile station 200 calculates PHR for CC with no UL grant allocated based on the bandwidth for PHR calculation.

In step ST304, mobile station 200 transmits PHR for CC with no UL grant allocated.

As described above, according to the present embodiment, PHR bandwidth notification section 105 in base station 100 determines a bandwidth for power headroom calculation used by mobile station 200 to calculate a power headroom in a component carrier to which no uplink allocation signal (UL grant) is mapped and forms a notification signal including information an the determined bandwidth for power headroom calculation, and the transmitting section (modulation section 106, transmission RF section 107) transmits the formed notification signal to mobile station 200. To be more specific, PHR bandwidth notification section 105 determines the bandwidth or PHR calculation corresponding to the estimated path-loss level.

By so doing, a value corresponding to the estimated path-loss level of mobile station 200 is reported without setting the bandwidth for power headroom calculation to a fixed value, and it is thereby possible to reduce the probability that the power headroom value may fall out of a reported range. As a result, it is possible to improve the accuracy of link adaptation by base station 100 that receives a power headroom report and thereby improve the system performance.

Furthermore, according to the present embodiment, PHR calculation section 205 in mobile station 200 calculates a power headroom of a component carrier with no uplink allocation signal mapped thereto based on information on the bandwidth for power headroom calculation transmitted from base station 100 used to calculate a power headroom indicating a transmission power reserve capacity in the component carrier with no uplink allocation signal mapped thereto.

[Embodiment 2]

In Embodiment 2, L types of bandwidths used for Sounding RS (SRS) (that is, SRS bandwidth) are used as bandwidths for PHR calculation. A PHR calculated with this bandwidth for PHR calculation corresponds to a PHR of SRS. Therefore, the base station can use this PHR for bandwidth control on SRS.

Figure 11:
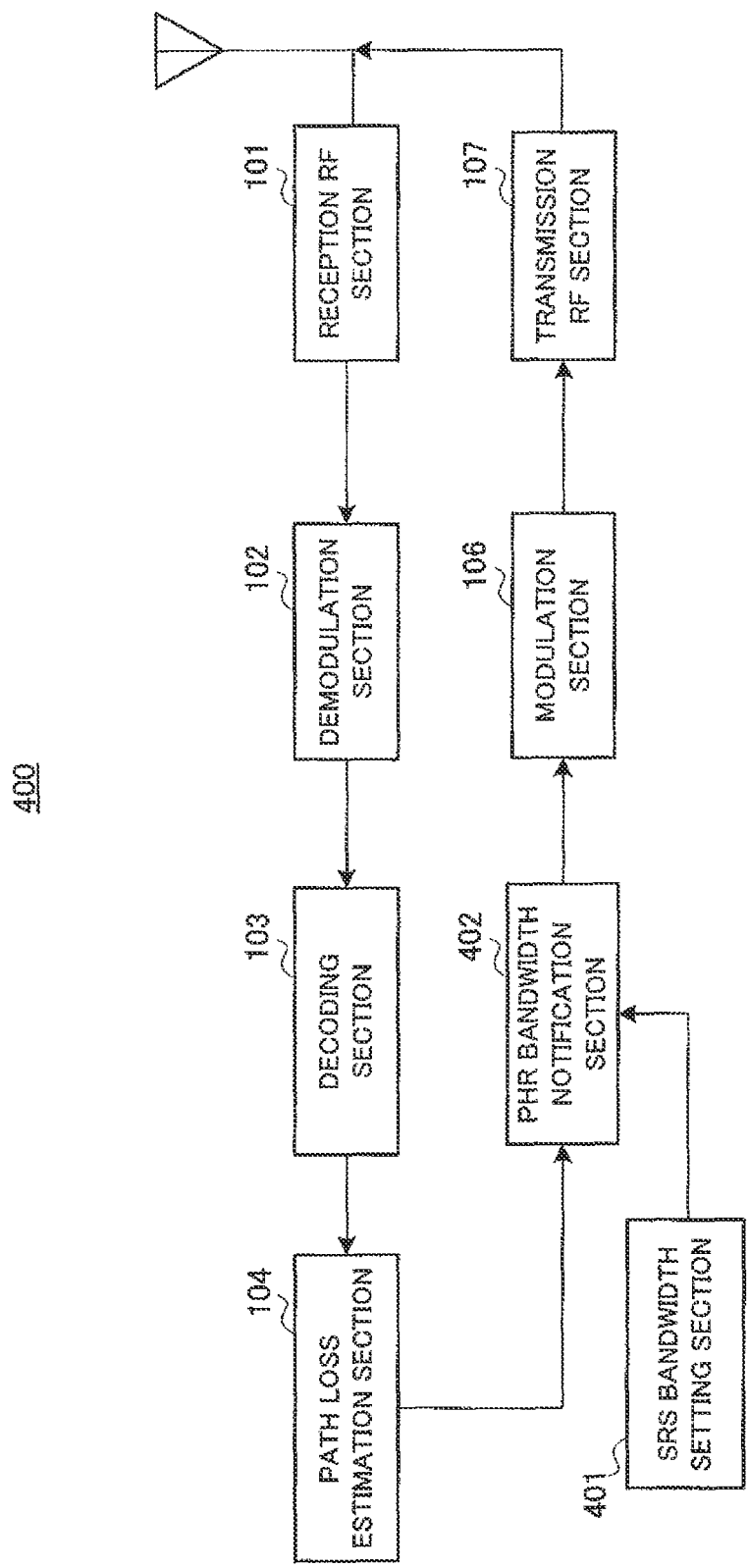
FIG. 11 is a block diagram illustrating a configuration of a base station according to Embodiment 2 of the present invention.

FIG. 11 is a block diagram illustrating a configuration of base station 400 according to Embodiment 2 of the present invention. In FIG. 11, base station 400 includes SRS bandwidth setting section 401 and PHR bandwidth notification section 402.

SRS bandwidth setting section 401 sets L types (L is a natural number) of SRS (Sounding Reference Signal) bandwidths defined beforehand for an entire cell or system in PHR bandwidth notification section 402 as a bandwidth for PHR calculation associated with an estimated path-loss level candidate.

For example, in LTE, four types of SRS bandwidths are set in one cell as shown in FIG. 12. For example, in a cell in which SRS BW Configuration#0 is set, four types of bandwidths; "96 RBs, 48 RBs, 24 RBs and 4 RBs" can be used for SRS transmission as shown in FIG. 13. In this case, SRS bandwidth setting section 401 sets these four types of bandwidths in PHR bandwidth notification section 402 as bandwidths for PHR calculation associated with the estimated path-loss level candidate. As a result, the bandwidth determining table stored in PHR bandwidth notification section 402 has a form as shown, for example, in FIG. 13.

PHR bandwidth notification section 402 selects bandwidth for PHR calculation corresponding to the estimated path-loss level received from path loss estimation section 104 and outputs information on the selected bandwidth for PHR calculation to modulation section 106.

Figure 14:
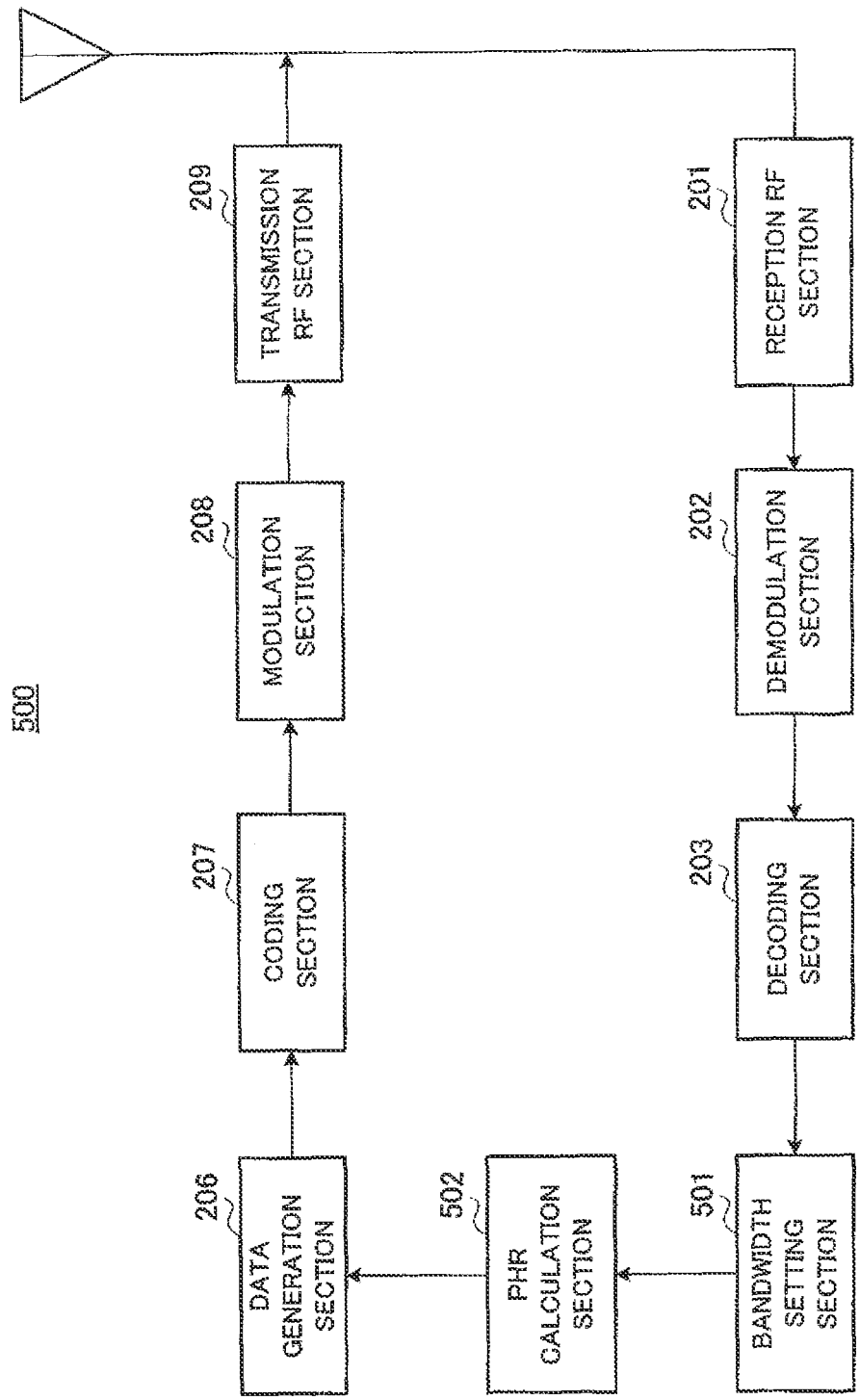
FIG. 14 is a block diagram illustrating a configuration of a mobile station according to Embodiment 2 of the present invention.

FIG. 14 is a block diagram showing a configuration of mobile station 500 according to Embodiment 2 of the present invention. In FIG. 14, mobile station 500 includes bandwidth setting section 501 and PHR calculation section 502.

Bandwidth setting section 501 identifies a bandwidth corresponding to the PHR calculation bandwidth information received from decoding section 203 in basically the same way as bandwidth setting section 204 of Embodiment 1 and sets the identified bandwidth in PHR calculation section 502. However, bandwidth setting section 501 stores L types (L is a natural number) of SRS (Sounding Reference Signal) bandwidths defined beforehand in the cell or the entire system as bandwidths for PHR calculation associated with the estimated path-loss level candidate.

PHR calculation section 502 calculates PHR for CC with no UL grant allocated based on the bandwidth for PHR calculation received from bandwidth setting section 501.

Operations of base station 400 and mobile station 500 having the above-described configurations will be described. Since the operation flow is the same as that in FIG. 10, the operation flow will be described using FIG. 10.

In step ST301, mobile station 500 reports path-loss level information of mobile station 500 to base station 400.

Base station 400 estimates a path-loss level of mobile station 500 and determines a bandwidth for PHR calculation corresponding to the estimated path-loss level.

In step ST302, base station 400 reports the determined PHR calculation bandwidth information (Mpusch for PHR in FIG. 10 to mobile station 500. However, the reported bandwidth for PHR matches one of the L types (L is a natural number) of SRS bandwidths defined beforehand for the cell or the entire system. The bandwidths used as bandwidths for PHR calculation may be limited to some of the L types (L is a natural number) of SRS bandwidths. For example, one bandwidth selected from among SRS bandwidths may be set for all terminals in the cell. In a cell having a small cell radius where a variation in the path-loss level of the mobile station in the cell is small, it is possible to reduce the probability that a PHR may fall out of a reported range by also reducing the number of types of bandwidths set for each mobile station. Furthermore, it is possible to reduce the amount of signaling for PIM calculation by only reporting bandwidths of a limited number of types.

In step ST303, mobile station 500 calculates PHR for CC with no UL grant allocated based on the bandwidth for PHR calculation.

In step ST304, mobile station 500 transmits PHR for CC with no UL grant allocated.

As described above, according to the present embodiment, PHR bandwidth notification section 402 in base station 400 determines a bandwidth for power headroom calculation used by mobile station 500 based on the correlation between N types (N is a natural number) of path-loss level candidates and bandwidths for power headroom calculation corresponding to the respective estimated path-loss level candidates, and the estimated path-loss level. The bandwidths for power headroom calculation included in the correlation match the transmission bandwidths used for SRS.

By so doing, the sounding reference signal is determined based on the path-loss level of mobile station 500, and it is thereby possible to reduce the probability that a power headroom value may fall out of a reported range by causing the bandwidth for power headroom calculation included in the correlation to match the transmission bandwidth used for a sounding reference signal. As a result, it is possible to improve the accuracy of link adaptation by base station 400 that receives a report of the power headroom and thereby improve the system performance. By the way, the higher the path-loss level of mobile station 500, the smaller is the SRS bandwidth that is set.

Figure 15:
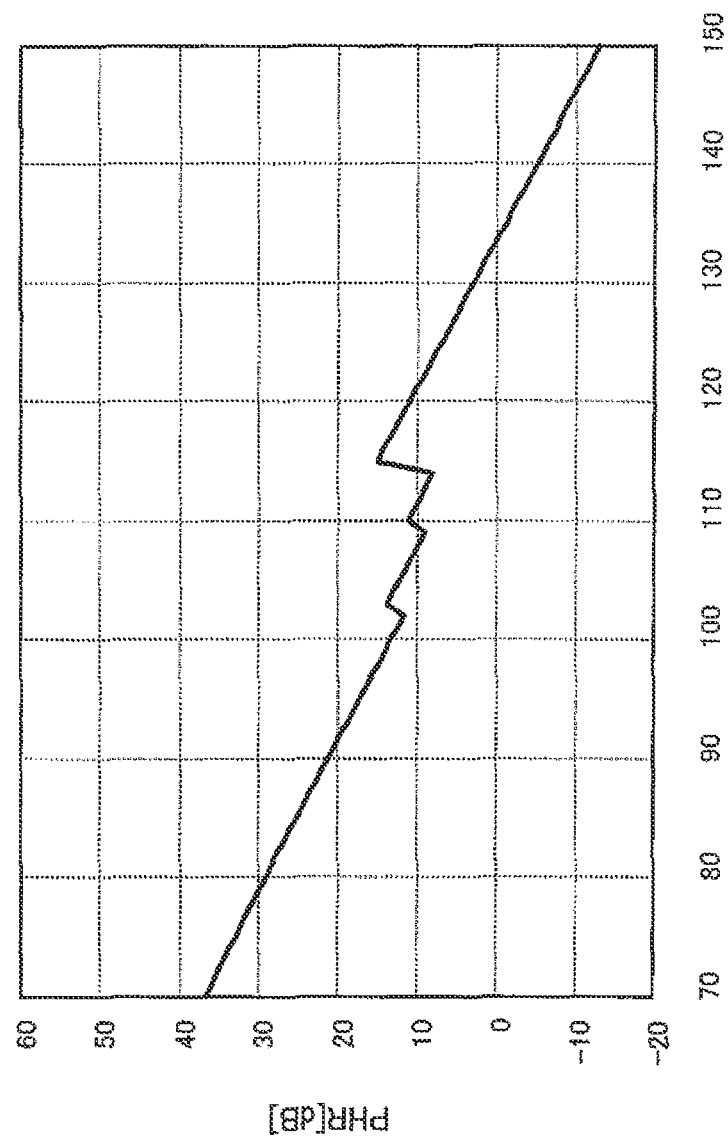
FIG. 15 is a diagram illustrating a correlation between a path loss and PHR in Embodiment 2.

FIG. 15 shows a relationship between path loss (PL) and PHR according to Embodiment 2. PHR is calculated from equation 3 and Po_pusch=−90 dBm, α=0.8, and f(i)=0 dB are set as parameters. Furthermore, as the correlation between N types (N is a natural number) of estimated path-loss level candidates and bandwidths for PHR calculation (here, SRS bandwidths) corresponding to the respective estimated path-loss level candidates, a correlation shown in FIG. 16 is used. As is clear from FIG. 15, according to Embodiment 2, it is possible to prevent PHR from falling out of a reported range.

Furthermore, base station 400 causes mobile station 500 to use an SRS bandwidth to calculate PHR and causes mobile station 500 to report the calculated PHR, and thereby has a merit that it is possible to easily comprehend PHR of SRS (that is, transmission power reserve capacity at the time of SRS transmission). If base station 400 can comprehend PHR of SRS, the PHR can be used to control the SRS transmission bandwidth. To be more specific, when PHR of SRS is small (that is, there is little reserve capacity in power), the SRS bandwidth is made to be smaller than that used to calculate PHR. On the other hand, when PHR of SRS is large (when there is a reserve capacity in power), the bandwidth of SRS is made to be larger than that used to calculate PHR. This makes it possible to set a more appropriate SRS bandwidth for mobile station 500.

Furthermore, the fact that PHR of SRS can be easily comprehended will be described. PHR of SRS can be calculated as SRS_PHR in equation 4.

[4]

$$SRS\_PHR = Pcmax - \{Psrs\_offset + 10 \log_{10}(Msrs) + Po\_pusch + \alpha \cdot PL + f(i)\} \quad \text{(Equation 4)}$$

Here, Msrs is a transmission bandwidth [RB] of SRS, Psrs_offset is a value [dBm] preset from the base station and is an offset value with respect to the transmission power of PUSCH. Po_pusch, $\alpha$, PL and f(i) are the same parameters as those used in equation 1. That is, identical SRS and PUSCH are used for transmission power control over TPC parameters or closed loop.

PHR using an SRS bandwidth (hereinafter referred to as "Ref_PHR") which is reported to base station 400 is calculated by substituting Msrs into Mpusch in equation 3. That is, Ref_PHR is calculated according to equation 5.

[5]

$$Ref\_PHR = SRS\_PHR - \{10 \log_{10}(Msrs) + Po\_pusch + \alpha \cdot PL + f(i)\} \quad \text{(Equation 5)}$$

Therefore, SRS_PHR (PHR of SRS) can be calculated by only subtracting Psrs_offset (predetermined parameter value) from Ref_PHR as shown in equation 6.

[6]

$$SRS\_PHR = Ref\_PHR - Psrs\_offset \quad \text{(Equation 6)}$$

When there is a cell for which SRS is not set, a default setting determined for a predetermined cell or the entire system may be used. Furthermore, when a mobile station to which an SRS bandwidth is not reported calculates PHR, a predetermined default setting for the cell or the entire system may be used.

Furthermore, when the setting of the SRS bandwidth differs among CCs, the SRS bandwidth set with CC with which PHR is reported may be used for PHR calculation.

[Embodiment 3]

In Embodiment 3, a terminal uses an SRS bandwidth used for SRS transmission before (e.g., immediately before) to calculate PHR for CC with no UL grant allocated.

Figure 17:
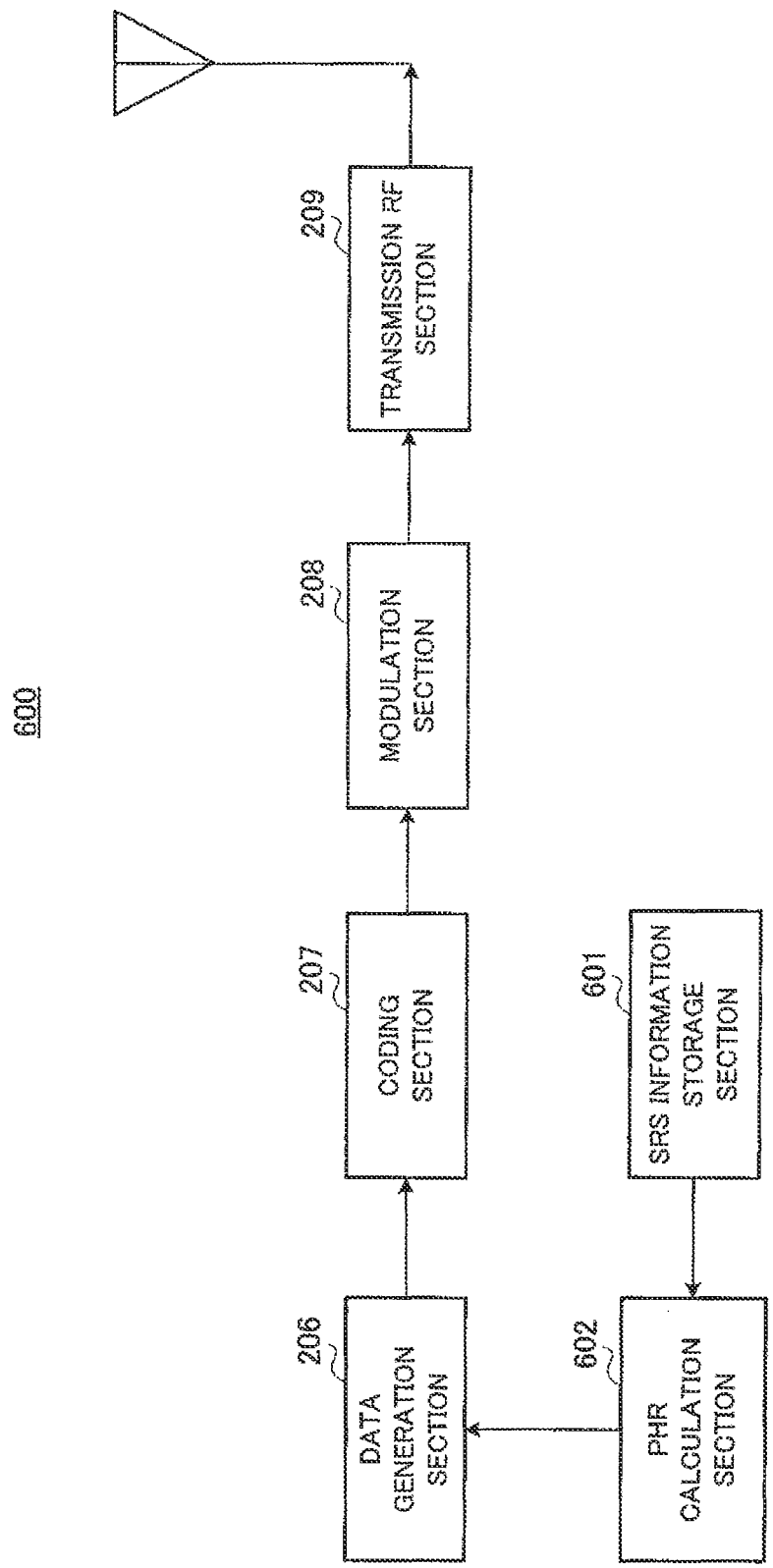
FIG. 17 is a block diagram illustrating a configuration of a mobile station according to Embodiment 3 of the present invention.

FIG. 17 is a block diagram illustrating a configuration of mobile station 600 according to Embodiment 3 of the present invention. In FIG. 17, mobile station 600 includes SRS information storage section 601 and PHR calculation section 602. In FIG. 17, mobile station 600 need not receive a signal to calculate PHR from the base station, and therefore description of the reception processing block is omitted.

SRS information storage section 601 stores SRS bandwidths used by mobile station 600 previously (e.g., immediately before) for SRS transmission. SRS information storage section 601 then sets the SRS bandwidth in PHR calculation section 602.

PHR calculation section 602 calculates PHR for CC with no UL grant allocated based on the SRS bandwidth received from SRS information storage section 601. To be more specific, PHR calculation section 602 calculates transmission power of SRS based on the SRS bandwidth, and calculates the PHR for CC with no UL grant allocated using the calculated transmission power of SRS and the maximum transmission power of mobile station 600.

Figure 18:
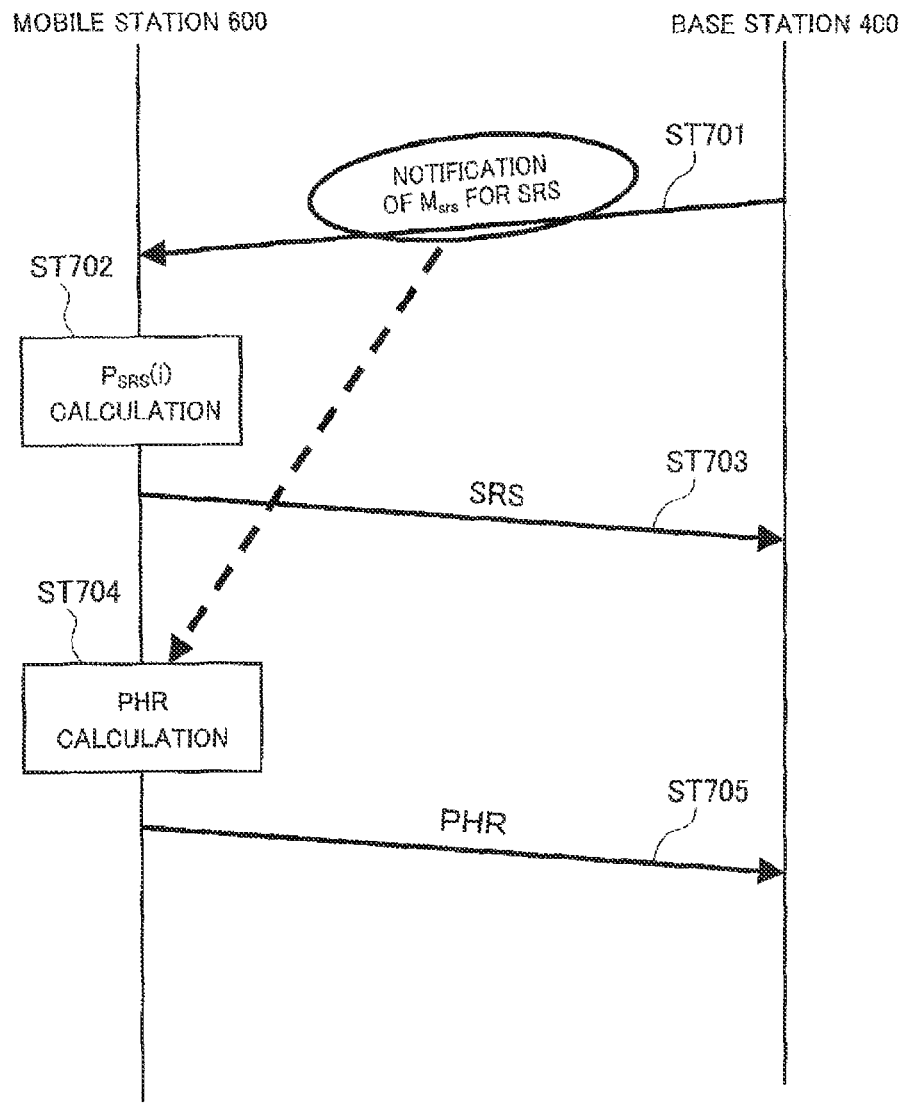
FIG. 18 is a sequence diagram illustrating operation of a mobile station.

Operation of mobile station 600 having the above-described configuration will be described. FIG. 18 is a flowchart illustrating the operation of mobile station 600.

in step ST701 the base station reports a bandwidth used for SRS transmission to mobile station 600. As the SRS bandwidth (Msrs), a widest bandwidth within a range not exceeding maximum transmission power of the mobile station is normally set to obtain a frequency scheduling gain.

In step ST702, mobile station 600 calculates transmission power of SRS from equation 7 using Msrs reported from the base station.

[7]

$$Psrs = \min(Pcmax, P'srs)$$

$$P'srs = 10 \log_{10}(Msrs) + Po\_pusch + \alpha \cdot PL + f(i) \quad \text{(Equation 7)}$$

In step ST703, mobile station 600 transmits SRS to the base station with the transmission power calculated in step ST702.

in step ST704, mobile station 600 calculates PHR from equation 8 using bandwidth Msrs used for the last SRS transmission,

[8]

$$PHR = Pcmax - \{10 \log_{10}(Msrs) + Po\_pusch + \alpha \cdot PL + f(i)\} \quad \text{(Equation 8)}$$

Alternatively, PHR may be calculated with Psrs_offset included as shown in equation 9. Since the calculation within parentheses in equation 9 is the same as P'srs in equation 7, the calculation processing in equation 9 may be omitted by storing P'srs after calculating transmission power of SRS.

[9]

$$PHR = Pcmax - \{Psrs\_offset + 10 \log_{10}(Msrs) + Po\_pusch + \alpha \cdot PL + f(i)\} \quad \text{(Equation 9)}$$

In step ST705, mobile station 600 reports PHR to the base station. Thus, reusing Msrs eliminates the necessity for reporting of a bandwidth from the base station to mobile station 600 to calculate PHR for CC with no UL grant allocated.

As described above, according to the present embodiment, PHR calculation section 602 in mobile station 600 calculates a power headroom of a component carrier to which no uplink allocation signal (UL grant) is mapped based on the bandwidth used before (e.g., immediately before) by mobile station 600 to transmit a sounding reference signal.

As the SRS bandwidth, a widest bandwidth within a range not exceeding maximum transmission power of the mobile station is normally set to obtain a frequency scheduling gain. Therefore, reusing this SRS bandwidth to calculate PHR can reduce the possibility that PHR may fall out of a reported range. Furthermore, as in the case of Embodiment 2, it is possible to obtain, a merit that PHR of SRS can be easily comprehended. Furthermore, since it is not necessary to report the bandwidth to calculate PHR from the base station to the mobile station, the amount of signaling can be reduced. Furthermore, calculating PHR by reusing the transmission power value at the time of SRS transmission allows the amount of processing to be reduced.

[Other Embodiments]

(1) The above embodiments have, been described assuming a case where the number of antennas of the mobile station is one. However, the number of antennas is not limited, to one, and when the mobile station has a plurality of antennas and calculates PHR of a UL channel with no UL grant allocated, the mobile station may derive, when a TPC parameter, path-loss level or SRS bandwidth differs from one antenna to another, one PHR through processing of averaging them or calculating a maximum value or the like. This allows the mobile station having a plurality of antennas to report one PHR.

(2) The above embodiments have been described by taking a case where the present invention is configured by hardware as an example, but the present invention may also be implemented by software in coordination with hardware.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI" "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-178672, filed on Aug. 9, 2010, including the specification, drawings and abstract is incorporated herein by reference in its entirety.

INDUSTRIAL APPLICABILITY

The base station, mobile station, method for transmitting calculation parameters for a power headroom and method for transmitting a power headroom of the present invention can reduce the probability that a power headroom value may fail out of a reported range and are useful in improving the accuracy of link adaptation.

REFERENCE SIGNS LIST 100, 400 base station
101, 201 reception RF section
102, 202 demodulation section
103, 203 decoding section
104 path loss estimation section
105, 402 PHR bandwidth notification section
106, 208 modulation section
107, 209 transmission RF section
200, 500, 600 mobile station
204, 501 bandwidth setting section
205, 502, 602 PHR calculation section
206 data generation section
207 coding section
401 SRS bandwidth setting section
601 SRS information storage section

The invention claimed is:

1. A base station that configures a plurality of component carriers for a mobile station and communicates with the mobile station using at least one of the plurality of component carriers, comprising:

a signal generation section that determines a bandwidth for power headroom calculation used by the mobile station to calculate a power headroom representing a transmission power reserve capacity of the mobile station in component carriers with no uplink allocation control signal allocated, and generates a notification signal containing information on the determined bandwidth for power headroom calculation;

a transmitting section that transmits the generated notification signal to the mobile station, and an estimation section that estimates a path-loss level between the mobile station and the base station, wherein:

the signal generation section determines a bandwidth for power headroom calculation used by the mobile station based on a correlation between N types (N is a natural number) of path-loss level candidates and bandwidths for power headroom calculation corresponding to the respective path-loss level candidates, and the estimated path-loss level.

2. The base station according to claim 1, wherein the correlation comprises at least one bandwidth for power headroom calculation greater than ½ of a system bandwidth in a system comprising the mobile station and the base station, and at least one bandwidth for power headroom calculation smaller than ½ of the system bandwidth.

3. A mobile station that communicates with a base station using at least one of a plurality of component carriers configured by the base station, comprising:

a calculation section that calculates a power headroom of a component carrier with no uplink allocation control signal allocated, based on information on a bandwidth for power headroom calculation transmitted from the base station used to calculate a power headroom representing a transmission power reserve capacity in the component carrier with no uplink allocation control signal allocated or a bandwidth used by the mobile station for last transmission of a sounding reference signal;

a transmitting section that transmits the calculated power headroom to the base station; and a receiving section that receives an identification number of a bandwidth for power headroom calculation transmitted from the base station, wherein:

the calculation section calculates a bandwidth for power headroom calculation of the component carrier with no uplink allocation signal mapped thereto based on a correlation between identification numbers of N types (N is a natural number) of bandwidths for power headroom calculation and bandwidths for power headroom calculation corresponding to the respective identification numbers, and the received identification number.

4. The mobile station according to claim 3, wherein the correlation comprises at least one bandwidth for power headroom calculation greater than ½ of a system bandwidth in a system comprising the base station and the mobile station, and at least one bandwidth for power headroom calculation smaller than ½ of the system bandwidth.

5. The mobile station according to claim 3, wherein the calculation section calculates a power headroom of the component carrier with no allocation control signal allocated, using transmission power of a sounding reference signal calculated based on a transmission bandwidth used for the sounding reference signal and maximum transmission power of the mobile station.

* * * * *